United States Patent
Qu

(10) Patent No.: US 10,067,589 B2
(45) Date of Patent: Sep. 4, 2018

(54) TOUCH UNIT AND MANUFACTURING METHOD THEREOF AND TOUCH SUBSTRATE

(71) Applicants: BOE TECHNOLOGY GROUP CO., LTD., Beijing (CN); BEIJING BOE DISPLAY TECHNOLOGY CO., LTD., Beijing (CN)

(72) Inventor: Lianjie Qu, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/541,920

(22) PCT Filed: Sep. 29, 2016

(86) PCT No.: PCT/CN2016/100707
§ 371 (c)(1),
(2) Date: Jul. 6, 2017

(87) PCT Pub. No.: WO2017/128754
PCT Pub. Date: Aug. 3, 2017

(65) Prior Publication Data
US 2018/0046291 A1 Feb. 15, 2018

(30) Foreign Application Priority Data
Jan. 28, 2016 (CN) .......................... 2016 1 0060248

(51) Int. Cl.
*G06F 3/041* (2006.01)
*G06F 3/044* (2006.01)

(52) U.S. Cl.
CPC ............ *G06F 3/0412* (2013.01); *G06F 3/044* (2013.01); *G06F 2203/04112* (2013.01)

(58) Field of Classification Search
CPC .................. G06F 3/0412; G06F 3/044; G06F 2203/04112
See application file for complete search history.

(56) References Cited

U.S. PATENT DOCUMENTS

2011/0057887 A1* 3/2011 Lin .......................... G06F 3/044
345/173
2014/0320763 A1 10/2014 Lee et al.
(Continued)

FOREIGN PATENT DOCUMENTS

CN 201853214 U 6/2011
CN 104407742 A 3/2015
(Continued)

OTHER PUBLICATIONS

Chinese Patent Office Search Report dated May 18, 2016; Appln. 201610060248.6.
(Continued)

*Primary Examiner* — Premal R Patel
(74) *Attorney, Agent, or Firm* — Ladas & Parry LLP; Loren K. Thompson

(57) ABSTRACT

A touch unit and a manufacturing method thereof and a touch substrate are provided. The touch unit includes a first touch electrode, a second touch electrode and a conductive branch, the second touch electrode includes a first sub-electrode, a second sub-electrode and a conductive bridge wire, the first sub-electrode is located at one side of the first touch electrode and the second sub-electrode is located at the other side of the first touch electrode, the conductive bridge wire strides over the first touch electrode and two ends of the conductive bridge wire are connected with the first sub-electrode and the second sub-electrode respectively; and the conductive branch is connected with the second touch electrode and insulated from the first touch electrode, and an orthogonal projection of the conductive
(Continued)

branch on a plane the first touch electrode at least partially located falls in a region corresponding to the first touch electrode.

16 Claims, 3 Drawing Sheets

(56) References Cited

U.S. PATENT DOCUMENTS

| | | | |
|---|---|---|---|
| 2015/0009422 A1* | 1/2015 | Tung | G06F 3/044 349/12 |
| 2016/0117031 A1* | 4/2016 | Han | G06F 3/0412 345/174 |
| 2017/0045979 A1* | 2/2017 | Li | G06F 3/044 |

FOREIGN PATENT DOCUMENTS

| | | |
|---|---|---|
| CN | 104750343 A | 7/2015 |
| CN | 105446570 A | 3/2016 |

OTHER PUBLICATIONS

The First Chinese Office Action dated Sep. 5, 2016; Appln. No. 201610060248.6.

The International Search Report and Written Opinion dated Jan. 5, 2017; PCT/CN2016/100707.

* cited by examiner

TOUCH UNIT AND MANUFACTURING METHOD THEREOF AND TOUCH SUBSTRATE

TECHNICAL FIELD

Embodiments of the present disclosure relate to a touch unit, a manufacturing method thereof, and a touch substrate.

BACKGROUND

Capacitive touch units have advantages of accurate positioning and agility, and the capacitive touch units have been applied in numerous fields. The capacitive touch units are divided into a self-capacitive type and a mutual-capacitive type, and the mutual-capacitive type touch units can realize multipoint touch, so that the mutual-capacitive type touch units become a mainstream in the market and a development trend in the future.

Mutual-capacitive type touch screens are divided into two structures of an on-cell mode and an integrated mode, and an integrated type mutual-capacitive type touch screen (also called as an in-cell mutual-capacitive type touch screen, short for an in-cell type touch screen hereinafter) is formed by integrating touch units between an opposed substrate and an array substrate of a display panel. An on-cell type touch panel is formed by laminating touch units on a display panel, so that a thickness and a weight of the whole display device are inevitably increased, and the light transmittance is decreased, which are not meet the requirements of the development trend of thinness and lightness of the current display device. In a case that the capacitive type touch units are applied to the in-cell type touch screen, the touch units of the in-cell type touch screen are integrated into the display panel, the in-cell type touch screen has obvious advantages of reducing the thickness of the display device and improving the transmittance, and the lightness and thinness effects of the display device can be realized while the touch control function is realized. However, whether the on-cell mode or the integrated mode, a capacitance between the touch electrodes in the touch unit is apt to be interfered by an electric field in the display panel, as a result the signal noise ratio of an output signal is lower, the signal noise ratio of a touch inductive signal output by the whole touch unit is also lower, and further the precision of touch recognition of the touch unit is lower.

SUMMARY

A touch unit and a manufacturing method thereof and a touch substrate are provided in the embodiments of the present disclosure, which can at least solve the technical problem of a lower precision of touch recognition of the current touch unit.

At least one embodiment of the present disclosure provides a touch unit, and the touch unit comprises: a first touch electrode, a second touch electrode and a conductive branch, wherein the second touch electrode comprises a first sub-electrode, a second sub-electrode and a conductive bridge wire; the first sub-electrode is located at one side of the first touch electrode and the second sub-electrode is located at the other side of the first touch electrode; the conductive bridge wire strides over the first touch electrode, and two ends of the conductive bridge wire are connected with the first sub-electrode and the second sub-electrode respectively; and the conductive branch is connected with the second touch electrode and insulated from the first touch electrode, and an orthogonal projection of the conductive branch on a plane where the first touch electrode is at least partially located falls in a region corresponding to the first touch electrode.

For example, in the touch unit provided in at least one embodiment of the present disclosure, an insulating layer is disposed on the first sub-electrode, the second sub-electrode and the first touch electrode, and the conductive bridge wire and the conductive branch are disposed on the insulating layer.

For example, in the touch unit provided in at least one embodiment of the present disclosure, first via holes are arranged in the insulating layer, and the conductive bridge wire is connected with the first sub-electrode and the second sub-electrode through the first via holes.

For example, in the touch unit provided in at least one embodiment of the present disclosure, second via holes are arranged in the insulating layer, and the conductive branch is connected with the first sub-electrode and the second sub-electrode through the second via holes.

For example, in the touch unit provided in at least one embodiment of the present disclosure, a second via hole is arranged in the insulating layer, and the conductive branch is connected with the first sub-electrode or the second sub-electrode through the second via hole.

For example, in the touch unit provided in at least one embodiment of the present disclosure, the conductive branch is connected with the conductive bridge wire.

For example, in the touch unit provided in at least one embodiment of the present disclosure, the orthogonal projection of the conductive branch on the plane where the first touch electrode is entirely located falls in the region corresponding to the first touch electrode.

For example, in the touch unit provided in at least one embodiment of the present disclosure, the conductive branch and the conductive bridge wire are arranged on a same layer.

For example, in the touch unit provided in at least one embodiment of the present disclosure, the conductive branch comprises a first conductive sub-branch and a second conductive sub-branch, and the first conductive sub-branch is located at one side of the conductive bridge wire and the second conductive sub-branch is located at the other side of the conductive bridge wire.

For example, in the touch unit provided in at least one embodiment of the present disclosure, the first conductive sub-branch and the second conductive sub-branch have different shapes.

At least one embodiment of the present disclosure further provides a manufacturing method of a touch unit, and the manufacturing method comprises: providing a base substrate; forming a first touch electrode, a second electrode and a conductive branch on the base substrate; wherein the second touch electrode comprises a first sub-electrode, a second sub-electrode and a conductive bridge wire, the first sub-electrode is located at one side of the first touch electrode and the second sub-electrode is located at the other side of the first touch electrode; the conductive bridge wire strides over the first touch electrode, and two ends of the conductive bridge wire are connected with the first sub-electrode and the second sub-electrode respectively; and the conductive branch is connected with the second touch electrode and insulated from the first touch electrode, and an orthogonal projection of the conductive branch on a plane where the first touch electrode is at least partially falls in a region corresponding to the first touch electrode.

For example, in the manufacturing method provided in at least one embodiment of the present disclosure, forming the first touch electrode, the second touch electrode and the conductive branch on the base substrate comprises the following operations: forming the first touch electrode, the first sub-electrode and the second sub-electrode on the base substrate by one patterning process; forming an insulating layer on the first touch electrode, the first sub-electrode and the second sub-electrode; forming the conductive bridge wire and the conductive branch on the insulating layer by one patterning process, wherein the conductive bridge wire is connected with the first sub-electrode and the second sub-electrode through a first via hole, and the conductive branch is connected with the conductive bridge wire; and the first sub-electrode is located at one side of the first touch electrode and the second sub-electrode is located at the other side of the first touch electrode.

At least one embodiment of the present disclosure further provides a touch substrate, and the touch substrate comprises: a base substrate; and the touch unit disposed on the base substrate.

For example, in the touch substrate provided in at least one embodiment of the present disclosure, a plurality of touch units are disposed to form a touch array, and in each touch unit, the first touch electrode extends along a first direction, and the second touch electrode extends along a second direction.

For example, the touch substrate provided in at least one embodiment of the present disclosure, in the touch array, the first touch electrodes arranged along the first direction are connected; the second touch electrodes arranged along the second direction are connected.

BRIEF DESCRIPTION OF THE DRAWINGS

In order to clearly illustrate the technical solution of the embodiments of the present disclosure, the drawings of the embodiments will be briefly described in the following. It is obvious that the described drawings are only related to some embodiments of the disclosure, and those skilled in the art can also obtain other drawings without any inventive work according to the drawings.

DETAILED DESCRIPTION

In order to clarify the objects, technical solutions and advantages of the present disclosure, the technical solutions of embodiments of the present disclosure will be described in a clearly and fully understandable way in connection with the drawings of the embodiments of the present disclosure. It is obvious that the described embodiments are just a part but not all of the embodiments of the disclosure. Based on the embodiments in the disclosure, those skilled in the art can obtain other embodiment(s), without any inventive work, which should be within the scope of the disclosure.

Figure 1:
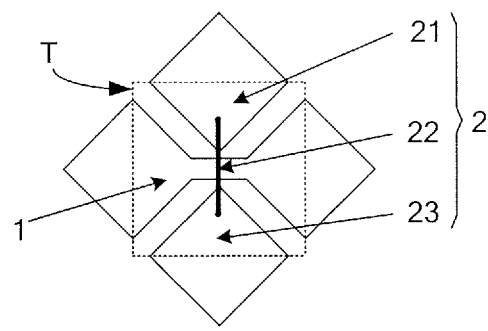
FIG. 1 is a structural schematic diagram of a mutual-capacitive type touch unit.

FIG. 1 is a structural schematic diagram of a mutual-capacitive type touch unit. As illustrated in FIG. 1, the touch unit T comprises: a first touch electrode 1 and a second touch electrode 2, the second touch electrode 2 comprises a first sub-electrode 21, a second sub-electrode 23 and a conductive bridge wire 22, the first sub-electrode 21 is located at one side of the first touch electrode and the second sub-electrode 23 is located at the other side of the first touch electrode I, and the conductive bridge wire 22 strides over the first touch electrode 1 to connect the first sub-electrode 21 with the second sub-electrode 23.

In a touch process, one of the first touch electrode and the second touch electrode serves as a touch scanning electrode and the other one serves as a touch sensing electrode, a mutual capacitance is generated between the first touch electrode and the second touch electrode, and the mutual capacitance comprises the capacitances respectively generated between the first sub-electrode 21 and the first touch electrode 1 and between the second sub-electrode 23 and the first touch electrode 1 by an edge electric field, as well as a capacitance generated between the conductive bridge wire 22 and the first touch electrode 1 by the edge electric field.

In the mutual-capacitive type touch unit as illustrated in FIG. 1, since the capacitances respectively between the first sub-electrode 21 and the first touch electrode 1 and between the second sub-electrode 23 and the first touch electrode 1 are apt to be interfered by an electric field in the display panel, as a result, a signal noise ratio of an output signal of this portion is lower, the signal noise ratio of a touch inductive signal output by the whole touch unit is also lower, and further a precision of touch recognition of the touch unit is lower.

At least one embodiment of the present disclosure provides a touch unit. The touch unit comprises a first touch electrode, a second touch electrode and a conductive branch, the second touch electrode comprises a first sub-electrode, a second sub-electrode and a conductive bridge wire, the first sub-electrode is located at one side of the first touch electrode and the second sub-electrode is located at the other side of the first touch electrode; the conductive bridge wire strides over the first touch electrode, and two ends of the conductive bridge wire are connected with the first sub-electrode and the second sub-electrode respectively; and the conductive branch is connected with the second touch electrode and insulated from the first touch electrode, and the orthogonal projection of the conductive branch on a plane where the first touch electrode is at least partially located falls in a region corresponding to the first touch electrode. The touch unit can solve the technical problem of a lower precision of touch recognition in the current touch unit.

Figure 2:
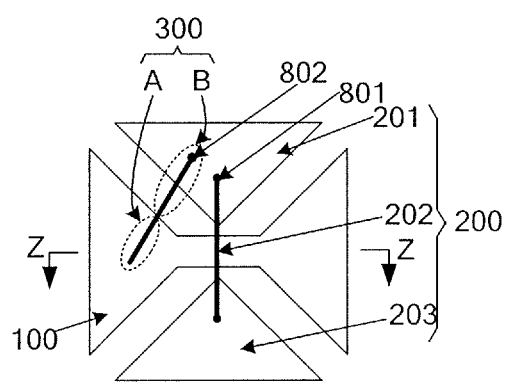
FIG. 2 is a structural schematic diagram of a touch unit provided by an embodiment of the present disclosure.
Figure 3:
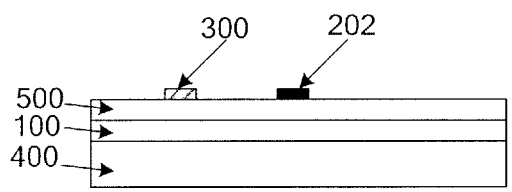
FIG. 3 is a schematic diagram of a section of a Z-Z direction in FIG. 2.

FIG. 2 is a structural schematic diagram of a touch unit provided by an embodiment of the present disclosure, and FIG. 3 is a schematic diagram of a section along a Z-Z direction in FIG. 2. As illustrated in FIGS. 2 and 3, the touch unit comprises a first touch electrode 100, a second touch electrode 200 and a conductive branch 300, the second touch electrode 200 comprises a first sub-electrode 201, a second sub-electrode 203 and a conductive bridge wire 202, the first sub-electrode 201 is located at one side of the first touch electrode 100 and the second sub-electrode 203 is located at the other side of the first touch electrode 100; the conductive bridge wire 202 strides over the first touch electrode 100, and two ends of the conductive bridge wire 202 are connected with the first sub-electrode 201 and the second sub-electrode 203 respectively; and the conductive branch 300 is connected with the second touch electrode 200 and insulated from the first touch electrode 100, and the orthogonal projection of the conductive branch 300 on a plane where the first touch electrode 100 is at least partially located falls in a region corresponding to the first touch electrode 100. It should be noted that, the touch unit provided by the embodiment of the present disclosure is located at the base substrate 400.

For example, as illustrated in FIG. 2, the conductive branch 300 contains a part of A whose orthogonal projection falls in the region corresponding to the first touch electrode 100 and a part B whose orthogonal projection falls outside the region corresponding to the first touch electrode 100.

On the conductive branch 3, regarding the part A, whose orthogonal projection falls in the region corresponding to the first touch electrode 100, an edge electric field can be generated between the part A and the first touch electrode 100, so that the mutual capacitance between the first touch electrode 100 and the second touch electrode 200 (the conductive branch 300 may be regarded as part of the second touch electrode 200) is effectively increased (on the conductive branch 300, the longer a total length of the part, whose orthogonal projection falls in a region corresponding to the first touch electrode 100, the larger the increment of the mutual capacitance between the first touch electrode 100 and the second touch electrode 200), that is, the amount of the usable information in a touch inductive signal output by the touch unit can be effectively improved, meanwhile, since the part A is shielded by the first touch electrode (the first touch electrode 100 can shield the interference of an electric field in the display panel), and the part A will not be affected by the electric field in the display panel in the touch process, that is, a noise signal is not generated.

On the conductive branch 3, regarding the part B, whose orthogonal projection falls outside the region corresponding to the first touch electrode 100, because the part B is far away from the first touch electrode 100, an edge electric field between the part B and the first touch electrode 100 is relatively smaller and thus an obvious influence will not be occurred on the mutual capacitance between the first touch electrode 100 and the second touch electrode 200.

It can be seen from the above, in the present embodiment, by disposing the conductive branch 300, the amount of usable information in the touch inductive signal output by the touch unit is increased, and the amount of noise information is not changed. A signal noise ratio of the touch inductive signal can be improved by the technical solution in the embodiments of the present disclosure, and it is favorable to improve the precision of the touch recognition.

In the present embodiment, as illustrated in FIG. 2, the first sub-electrode 201, the second sub-electrode 203 and the first touch electrode 100 are arranged at the same layer, an insulating layer 500 is disposed on the first sub-electrode 201, the second sub-electrode 203 and the first touch electrode 100, the positions of the insulating layer 500 corresponding to the first sub-electrode 201 and the second sub-electrode 203 are provided with first via holes 801, the conductive bridge wire 202 is disposed on the insulating layer 500, and the conductive bridge wire 202 is connected with the first sub-electrode 201 and the second sub-electrode 203 respectively through the first via holes 801.

For example, the insulating layer 500 is provided with second via holes for connecting the conductive branch 300 with the first sub-electrode 201 and the second sub-electrode 203, or the insulating layer 500 is further provided with a second via hole for connecting the conductive branch 300 with the first sub-electrode 201 or the second sub-electrode 203. The conductive branch 300 is disposed on the insulating layer 500, and the conductive branch 300 is connected with the first sub-electrode 201 and the second sub-electrode 203 through the second via holes. It should be noted that, FIG. 2 only schematically illustrates a case that the conductive branch 300 is connected with the first sub-electrode 201 through the second via hole 802, and no drawing corresponding to a case that the conductive branch 300 and the second sub-electrode 203 are connected through the second via hole.

In the present embodiment, the conductive branch 300 and the conductive bridge wire 202 may be arranged at the same layer above the insulating layer 500, at this time, the conductive branch 300 and the conductive bridge wire 202 can be prepared simultaneously through one patterning process, so that a production period is shortened.

Figure 4:
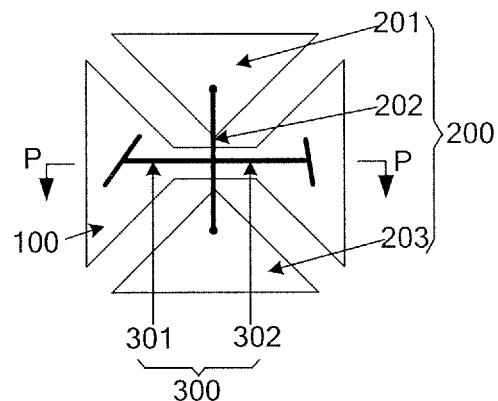
FIG. 4 is a structural schematic diagram of another touch unit provided by an embodiment of the present disclosure.
Figure 5:
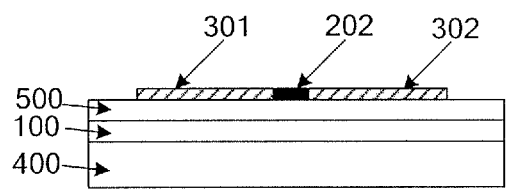
FIG. 5 is a schematic diagram of a section of a P-P direction in FIG. 4.

FIG. 4 is a structural schematic diagram of another touch unit provided by one embodiment of the present disclosure, and FIG. 5 is a schematic diagram of a section of a P-P direction in FIG. 4. As illustrated in FIGS. 4 and 5, the difference between the touch unit as illustrated in FIG. 4 and the touch unit as illustrated in FIG. 2 lies in: in the touch unit as illustrated in FIG. 4, the conductive branch 300 is directly connected with the conductive bridge wire 202, at this time, the whole orthogonal projection of the conductive branch 300 on the plane where the first touch electrode 100 is located falls in the region corresponding to the first touch electrode 100.

In the touch unit as illustrated in FIG. 2, taking a case that the conductive branch 300 is connected with the first sub-electrode 100 through the second via hole for example, at this time, the conductive branch 300 extends from the top of the first sub-electrode 201 to the top of the first touch electrode 100, therefore, the conductive branch 300 necessarily contains the part whose orthogonal projection falls in a gap between the first touch electrode 100 and the first sub-electrode 201, but the part is apt to be interfered by an electric field in the display panel, and as a result, a signal in the conductive branch is interfered.

In the touch unit as illustrated in FIG. 4, the conductive branch 300 is directly connected with the conductive bridge wire 202, and the conductive branch 300 is designed to some extent, so that the whole orthogonal projection of the conductive branch 300 on the plane where the first touch electrode 100 is located falls in the region corresponding to the first touch electrode 100. At this time, under the shielding action of the first touch electrode 100, the electric field in the display panel interference on the signal in the conductive branch 300 can be effectively avoided, and further, the precision of touch recognition of the touch unit is improved.

For example, the conductive branch 300 comprises: a first conductive sub-branch 301 and a second conductive sub-branch 302, the first conductive sub-branch 301 is located at one side of the conductive bridge wire 202 and the second conductive sub-branch 302 is located at the other side of the conductive bridge wire 202. In the present embodiment, by disposing the conductive sub-branches on both sides of the conductive bridge wire, the total length of the conductive branch 300 is effectively increased, at this time, on the conductive branch 300, the total length of the part, whose orthogonal projection falls in the region corresponding to the first touch electrode 100 is increased as much as possible, so that the mutual capacitance between the first touch electrode 100 and the second touch electrode 200 (the conductive branch may be regarded as a part of the second touch electrode) is correspondingly increased, that is, the amount of usable information in the touch control inductive signal output by the touch unit is increased, and further a signal noise ratio of the touch control inductive signal is correspondingly improved.

In a case of designing the shapes of the first conductive sub-branch 301 and the second conductive sub-branch 302, and the shape of the first conductive sub-branch 301 and the shape of the second conductive sub-branch 302 are the same, for the whole touch substrate, on the touch substrate, a periodicity of the conductive sub-branches having a same shape is too strong, so that the moire phenomenon is easy to occur. Therefore, in the present embodiment, the first conductive sub-branch 301 and the second conductive sub-branch 302 have different shapes, and on the touch substrate, the moire phenomenon can be effectively avoided.

It should be noted that, the shapes of the first touch electrode 100, the first sub-electrode 201, the second sub-electrode 203 and the conductive branch 300 illustrated in FIGS. 2 and 4 are merely exemplary, and do not limit the technical solution of the embodiment of the present disclosure. In the embodiments of the present disclosure, the conductive branch 300 is required to be a linear structure only to generate an edge electric field with the first touch electrode 100, the linear conductive branch 300 can be placed in any shapes, which are not exampled one by one.

According to the embodiments of the present disclosure, the conductive branch connected with the second touch electrode is disposed in the touch unit, and the orthogonal projection of the conductive branch on the plane where the first touch electrode is at least partially located falls in the region corresponding to the first touch electrode, so that the amount of usable information in the touch inductive signal output by the touch unit is effectively improved, further the signal noise ratio of the touch inductive signal is improved and therefore the precision of the touch recognition is favorably improved.

Figure 6:
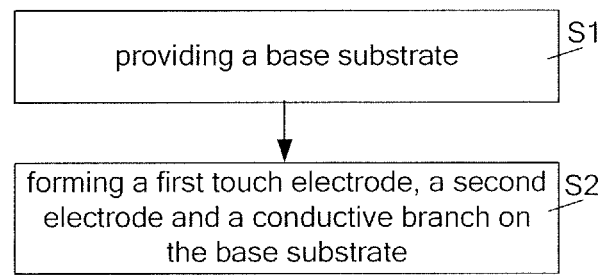
FIG. 6 is a flowchart of a manufacturing method of a touch unit provided by an embodiment of the present disclosure.

FIG. 6 is a flowchart of a manufacturing method of a touch unit provided by an embodiment of the present disclosure, as illustrated in FIG. 6, the manufacturing method is used for manufacturing the touch unit in the above embodiment, and the manufacturing method comprises:

S1: providing a base substrate;

S2: forming a first touch electrode, a second touch electrode and a conductive branch on the base substrate;

The second touch electrode comprises a first sub-electrode, a second sub-electrode and a conductive bridge wire, the first sub-electrode is located at one side of the first touch electrode and the second sub-electrode is located at the other side of the first touch electrode, the conductive bridge wire strides over the first touch electrode, and two ends of the conductive bridge wire are connected with the first sub-electrode and the second sub-electrode respectively.

The conductive branch is connected with the second touch electrode and insulated from the first touch electrode, and the orthogonal projection of the conductive branch on a plane where the first touch electrode is at least partially located falls in a region corresponding to the first touch electrode.

Figure 7:
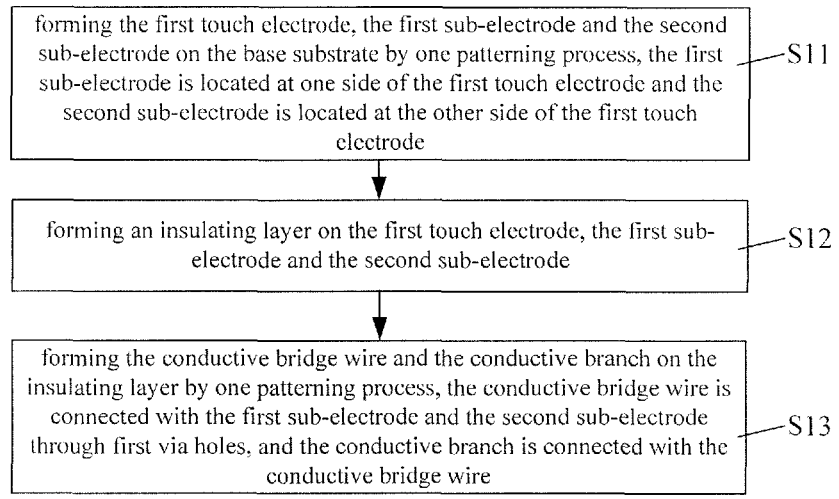
FIG. 7 is a flowchart of a manufacturing method of a touch unit provided by another embodiment of the present disclosure.

FIG. 7 is a flowchart of a manufacturing method of a touch unit provided by an embodiment of the present disclosure, the manufacturing method as illustrated in FIG. 7 is a solution based on the manufacturing method as illustrated in FIG. 6, the manufacturing method comprises:

S11: forming the first touch electrode, the first sub-electrode and the second sub-electrode on the base substrate by one patterning process, and the first sub-electrode is located at one side of the first touch electrode and the second sub-electrode is located at the other side of the first touch electrode.

As illustrated in FIGS. 4 and 5, in S11, a conductive electrode film layer is formed on the base substrate 1 in manners such as depositing, coating, sputtering and the like, a material of the conductive electrode film layer may be a conductive material such as indium tin oxide, silver nanowire and the like; and then patterns of the first touch electrode 100, the first sub-electrode 201 and the second sub-electrode 203 are formed by patterning processes.

It should be noted that, the patterning processes in the embodiment of the present disclosure comprise photoresist coating, exposing, developing, etching, photoresist peeling and the like.

S12: forming an insulating layer on the first touch electrode, the first sub-electrode and the second sub-electrode.

In S12, the insulating layer 500 is formed on the substrate processed in S11 in a manner of depositing, coating or sputtering and the like, and the insulating layer 500 covers the first touch electrode 100, the first sub-electrode 201 and the second sub-electrode 203. A material of the insulating layer 500 may be a resin material, silicon oxide, silicon nitride and the like.

It should be noted that, in order to connect the conductive bridge wire 202 in the subsequent operations with the first sub-electrode 201 and the second sub-electrode 202, corresponding connecting via holes are required to be formed in the positions of the insulating layer 500 corresponding to the first sub-electrode 201 and the second sub-electrode 203, for example, forming first via holes and second via holes.

S13: forming the conductive bridge wire and the conductive branch on the insulating layer by one patterning process, the conductive bridge wire is connected with the first sub-electrode and the second sub-electrode through first via holes, and the conductive branch is connected with the conductive bridge wire.

In S13, firstly, a conductive connecting film layer is formed on the insulating layer in a manner of depositing, coating or sputtering and the like, and a material of the conductive connecting film layer may be a conductive material such as indium tin oxide, Mo, Al and Cu; and then patterns of the conductive bridge wire 202 and the conductive branch 3 are formed by the patterning processes. The first sub-electrode 201, the conductive bridge wire 202 and the second sub-electrode 203 constitute the second touch electrode 200.

For example, as illustrated in FIGS. 2 and 3, the conductive branch 300 can be connected with the first sub-electrode and the second sub-electrode through second via holes, or the conductive branch 300 can be connected with the first sub-electrode or the second sub-electrode through the second via hole, at this time, the second via holes configured for connecting the conductive branch 300 with the first sub-electrode 201 and the second sub-electrode 203 are required to be formed in the insulating layer 500, or the second via hole configured for connecting the conductive branch 300 with the first sub-electrode 201 or the second sub-electrode 203 is required to be formed in the insulating layer 500.

Besides, the conductive bridge wire 202 and the conductive branch 300 in the embodiment of the present disclosure may be formed by two patterning processes, and detailed descriptions will be omitted here.

The manufacturing method of a touch unit provided by the embodiment of the present disclosure, the conductive branch connected with the second touch electrode is disposed in the touch unit, and the orthogonal projection of the conductive branch on the plane where the first touch electrode is at least partially located falls in the region corresponding to the first touch electrode, so that, the amount of usable information in the touch inductive signal output by the touch unit is effectively improved, further the signal noise ratio of the touch inductive signal is improved, and the precision of touch recognition is improved.

Figure 8:
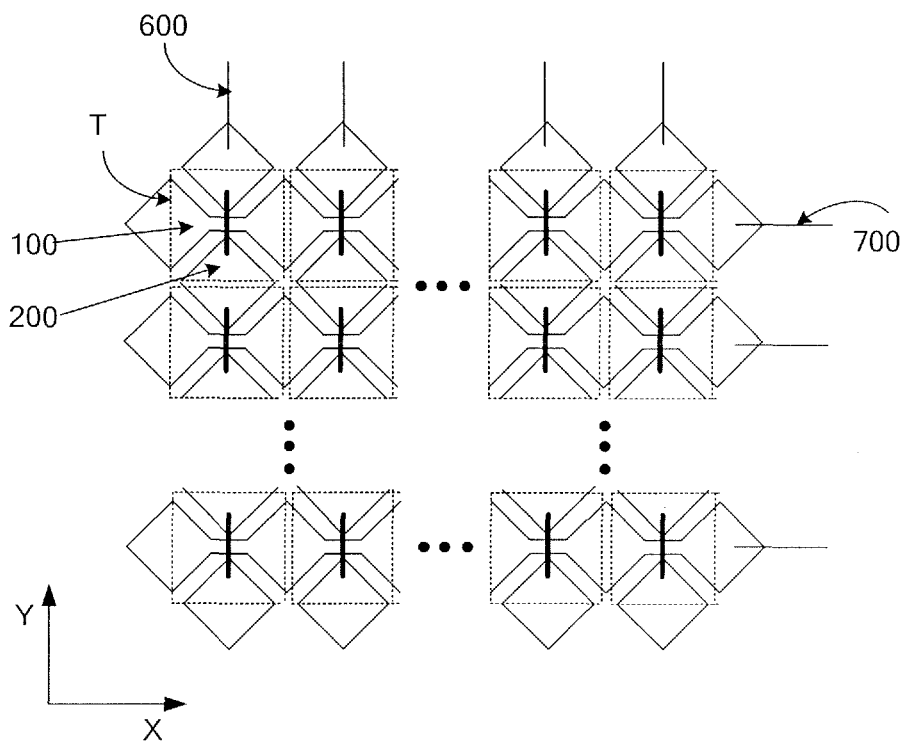
FIG. 8 is a structural schematic diagram of a touch substrate provided by an embodiment of the present disclosure.

FIG. 8 is a structural schematic diagram of a touch substrate provided by an embodiment of the present disclosure, as illustrated in FIG. 8, the touch substrate comprises a base substrate (not illustrated in FIG. 8) and a touch unit T disposed on the base substrate, the touch unit adopts the above touch unit T, and related descriptions of the touch unit may refer to the related contents described above, and detailed descriptions will be omitted here.

For example, in a case that the amount of the touch units T is multiple, the first touch electrode 100 in each touch units T extends along a first direction X, the second touch electrode 200 extends along a second direction Y, and all the touch units T form a touch array; in the touch array, the first touch electrodes 100 of each touch units T arranged along the first direction X are connected, and the second touch electrodes 200 of each touch units arranged along the second direction Y are connected. At this time, all of the first touch electrodes 100 arranged along the first direction X carry out signal transmission by using a same signal wire 700, and all of the second touch electrodes 200 arranged along the second direction Y carry out signal transmission by using a same signal wire 600, so that the quantity of the signal wires on the touch substrate can be effectively reduced.

The touch substrate provided by the embodiment of the present disclosure has a higher precision of touch recognition.

Embodiments of the present disclosure provide a touch unit and a manufacturing method thereof and a touch substrate, and the touch unit comprises: a first touch electrode, a second touch electrode and a conductive branch, the second touch electrode comprises a first sub-electrode, a second sub-electrode and a conductive bridge wire; the first sub-electrode is located at one side of the first touch electrode and the second sub-electrode is located at the other side of the first touch electrode; the conductive bridge wire strides over the first touch electrode, and two ends of the conductive bridge wire are connected with the first sub-electrode and the second sub-electrode respectively; and the conductive branch is connected with the second touch electrode and insulated from the first touch electrode, and the orthogonal projection of the conductive branch on the plane where the first touch electrode is at least partially located falls in the region corresponding to the first touch electrode. The technical solution of the embodiments of the present disclosure can effectively improve the amount of usable information in the touch inductive signal output by the touch unit, further the signal noise ratio of the touch inductive signal is improved and the precision of touch recognition is favorably improved.

It is obvious that those skilled in the art can make various changes or modifications to the present disclosure without departing from the spirit and scope of the present disclosure. Thus, if such changes and modifications to the present disclosure are within the scope of the claims of the present disclosure and equivalent thereof, the present disclosure also intends to include all such changes and modifications within its scope.

What are described above is related to the illustrative embodiments of the disclosure only and not limitative to the scope of the disclosure. Therefore, the scopes of the disclosure are defined by the accompanying claims.

The application claims priority of Chinese Patent Application No. 201610060248.6 filed on Jan. 28, 2016, the disclosure of which is incorporated herein by reference in its entirety as part of the present application.

What is claimed is:

1. A touch unit, comprising: a first touch electrode, a second touch electrode and a conductive branch, wherein
    the second touch electrode comprises a first sub-electrode, a second sub-electrode and a conductive bridge wire; the first sub-electrode is located at one side of the first touch electrode and the second sub-electrode is located at the other side of the first touch electrode; the conductive bridge wire strides over the first touch electrode, and two ends of the conductive bridge wire are connected with the first sub-electrode and the second sub-electrode respectively; and
    the conductive branch is connected with the second touch electrode and insulated from the first touch electrode, and an orthogonal projection of the conductive branch on a plane where the first touch electrode is at least partially located falls in a region corresponding to the first touch electrode;
    an insulating layer is disposed on the first sub-electrode, the second sub-electrode and the first touch electrode, and
    the conductive bridge wire and the conductive branch are disposed on the insulating layer.

2. The touch unit according to claim 1, wherein first via holes are arranged in the insulating layer, and the conductive bridge wire is connected with the first sub-electrode and the second sub-electrode through the first via holes.

3. The touch unit according to claim 2, wherein the conductive branch and the conductive bridge wire are arranged on a same layer.

4. The touch unit according to claim 1, wherein second via holes are arranged in the insulating layer, and the conductive branch is connected with the first sub-electrode and the second sub-electrode through the second via holes.

5. The touch unit according to claim 4, wherein the conductive branch and the conductive bridge wire are arranged on a same layer.

6. The touch unit according to claim 1, wherein a second via hole is arranged in the insulating layer, and the conductive branch is connected with the first sub-electrode or the second sub-electrode through the second via hole.

7. The touch unit according to claim 6, wherein the conductive branch and the conductive bridge wire are arranged on a same layer.

8. The touch unit according to claim 1, wherein the conductive branch is connected with the conductive bridge wire.

9. The touch unit according to claim 8, wherein the orthogonal projection of the conductive branch on the plane where the first touch electrode is entirely located falls in the region corresponding to the first touch electrode.

10. The touch unit according to claim 1, wherein the conductive branch and the conductive bridge wire are arranged on a same layer.

11. The touch unit according to claim 10, wherein the conductive branch comprises a first conductive sub-branch and a second conductive sub-branch, and
the first conductive sub-branch is located at one side of the conductive bridge wire and the second conductive sub-branch is located at the other side of the conductive bridge wire.

12. The touch according to claim 11, wherein the first conductive sub-branch and the second conductive sub-branch have different shapes.

13. A touch substrate, comprising:
a base substrate; and
the touch unit according to claim 1 disposed on the base substrate.

14. The touch substrate according to claim 13, wherein a plurality of touch units are disposed to form a touch array, and in each touch unit, the first touch electrode extends along a first direction, and the second touch electrode extends along a second direction.

15. The touch substrate according to claim 14, wherein in the touch array, the first touch electrodes arranged along the first direction are connected, and the second touch electrodes arranged along the second direction are connected.

16. A manufacturing method of a touch unit, comprising:
providing a base substrate; and
forming a first touch electrode, a second electrode and a conductive branch on the base substrate;
wherein the second touch electrode comprises a first sub-electrode, a second sub-electrode and a conductive bridge wire, the first sub-electrode is located at one side of the first touch electrode and the second sub-electrode is located at the other side of the first touch electrode; the conductive bridge wire strides over the first touch electrode, and two ends of the conductive bridge wire are connected with the first sub-electrode and the second sub-electrode respectively; and
the conductive branch is connected with the second touch electrode and insulated from the first touch electrode, and an orthogonal projection of the conductive branch on a plane where the first touch electrode is at least partially located falls in a region corresponding to the first touch electrode;
wherein forming of the first touch electrode, the second touch electrode and the conductive branch on the base substrate comprises:
forming the first touch electrode, the first sub-electrode and the second sub-electrode on the base substrate by one patterning process;
forming an insulating layer on the first touch electrode, the first sub-electrode and the second sub-electrode; and
forming the conductive bridge wire and the conductive branch on the insulating layer by one patterning process,
wherein the conductive bridge wire is connected with the first sub-electrode and the second sub-electrode through a first via hole, and the conductive branch is connected with the conductive bridge wire; and
the first sub-electrode is located at one side of the first touch electrode and the second sub-electrode is located at the other side of the first touch electrode.

* * * * *